United States Patent
Ishikawa et al.

(10) Patent No.: US 12,146,764 B2
(45) Date of Patent: Nov. 19, 2024

(54) RANGING METHOD AND RANGE FINDER

(71) Applicant: THE NIPPON SIGNAL CO., LTD., Tokyo (JP)

(72) Inventors: Tomoyuki Ishikawa, Kuki (JP); Hirotaka Yamada, Kuki (JP); Hajime Sannomiya, Kuki (JP)

(73) Assignee: THE NIPPON SIGNAL CO., LTD., Tokyo (JP)

(*) Notice: Subject to any disclaimer, the term of this patent is extended or adjusted under 35 U.S.C. 154(b) by 1006 days.

(21) Appl. No.: 17/254,252

(22) PCT Filed: Jun. 12, 2019

(86) PCT No.: PCT/JP2019/023253
§ 371 (c)(1),
(2) Date: Dec. 18, 2020

(87) PCT Pub. No.: WO2019/244736
PCT Pub. Date: Dec. 26, 2019

(65) Prior Publication Data
US 2021/0262794 A1     Aug. 26, 2021

(30) Foreign Application Priority Data
Jun. 21, 2018   (JP) ................................ 2018-118307

(51) Int. Cl.
*G01C 3/06*     (2006.01)
*G01S 7/4865*   (2020.01)
(Continued)

(52) U.S. Cl.
CPC .............. *G01C 3/06* (2013.01); *G01S 7/4865* (2013.01); *G01S 7/487* (2013.01); *G01S 17/10* (2013.01)

(58) Field of Classification Search
CPC ......... G01C 3/06; G01S 7/4865; G01S 7/487; G01S 17/10
See application file for complete search history.

(56) References Cited

U.S. PATENT DOCUMENTS

| 6,650,403 B2 | 11/2003 | Ogawa et al. |
| 10,605,919 B2 | 3/2020 | Kramper et al. |

(Continued)

FOREIGN PATENT DOCUMENTS

| CN | 203688801 U | 7/2014 |
| EP | 2182377 | 5/2010 |

(Continued)

OTHER PUBLICATIONS

International Preliminary Report on Patentability from PCT/JP2019/023253, dated Dec. 30, 2020, 20 pages including English language translation.

(Continued)

*Primary Examiner* — Luke D Ratcliffe
*Assistant Examiner* — Joseph C Fritchman
(74) *Attorney, Agent, or Firm* — Morgan, Lewis & Bockius LLP

(57) ABSTRACT

A ranging method and a range finder allow reliable measurement of the distance to a target object even when the target object has a very low reflectivity and/or under conditions with disturbances. The range finder includes: a light receiving element configured to receive a reflected component of light emitted to a target object; a first detection unit and a second detection unit configured to perform two different types of detections with different detection gains; and a distance/light-intensity calculation processing unit serves as a calculation unit for calculating a measured distance based on a combination of result patterns of the detections performed by the first and second detection units.

(Continued)

The range finder determines a distance by causing each of the first and second detection units performs at least two detections with a time interval per a single light emission.

6 Claims, 8 Drawing Sheets

(51) Int. Cl.
    *G01S 7/487*     (2006.01)
    *G01S 17/10*     (2020.01)

(56) References Cited

U.S. PATENT DOCUMENTS

| | | |
|---|---|---|
| 2002/0145725 A1 | 10/2002 | Ogawa |
| 2013/0003041 A1 | 1/2013 | Sigmun et al. |
| 2019/0383735 A1* | 12/2019 | Ray .................... G01S 17/04 |

FOREIGN PATENT DOCUMENTS

| | | |
|---|---|---|
| JP | 2002-311138 | 10/2002 |
| JP | 2011-021980 | 2/2011 |
| JP | 2011021980 A * | 2/2011 |
| JP | 2015-200555 | 11/2015 |
| JP | 2016-014535 | 1/2016 |
| WO | WO 2016/173711 | 11/2016 |

OTHER PUBLICATIONS

Office Action from Taiwan Patent Application No. 108121197, dated Mar. 28, 2023, 13 pages including translation.
Extended European Search Report from European Patent Application No. 19823068.2, dated Feb. 14, 2022, 11 pages.

* cited by examiner

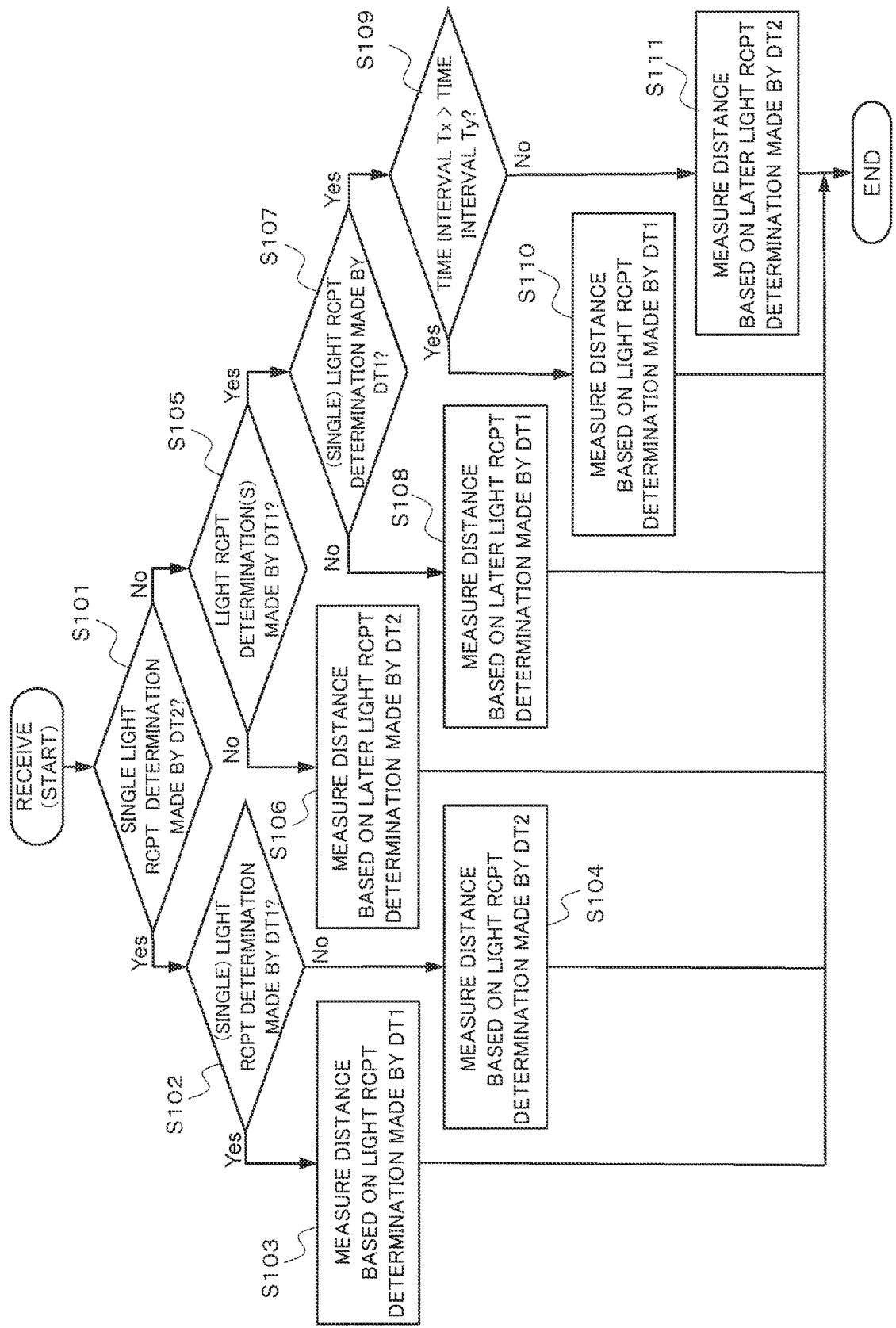

RANGING METHOD AND RANGE FINDER

TECHNICAL FIELD

The present invention relates to a ranging method and a range finder for measuring a distance to a target object by emitting a pulsed light or other light to the target object and receiving reflected light components of the emitted light.

BACKGROUND ART

A known example of devices for measuring distances using the method as described above has a rising edge circuit and a resonant circuit (see Patent Document 1). The technique disclosed in Patent Document 1 uses these different circuits in combination to measure the distance to a target object, thereby allowing successful distance measurement even in foggy environments or other environments with disturbances, based on a light intensity difference between detected light reflected from the fog and detected light reflected from the target object.

In the technique of Patent Document 1, a threshold for the rising edge circuit and/or the like needs to be previously defined based on a presumed light intensity of reflected light of interest. Accordingly, the technique of Patent Document 1 may fail to give accurate detection in some cases, such as when the target object has a very low reflectivity and/or under unexpectedly thick fog conditions or other conditions with serious disturbances.

REFERENCE DOCUMENT LIST

Patent Document

Patent Document 1: JP 2011-21980 A

SUMMARY OF THE INVENTION

Problem to be Solved by the Invention

The present invention has been made in view of the above circumstances, and an object of the present invention is to provide a ranging method and a range finder which allow reliable measurement of the distance to a target object even when the target object has a very low reflectivity and/or under conditions with disturbances.

Means for Solving the Problem

To achieve the above object, a ranging method for measuring a distance to a target object, by emitting light to the target object and performing first detection and second detection for detecting reception of a reflected component of the emitted light, the first detection and the second detection being performed with different detection gains, includes: performing, for a single light emission, at least two first detections with a time interval and at least two second detections with a time interval; and calculating a measured distance based on a combination of result patterns of the first detections and the second detections.

In the above ranging method, for a single light emission, at least two first detections with a time interval and at least two second detections with a time interval are performed for detecting reception of a reflected light component in such a manner that a gain in each first detection differs from a gain in each second detection, and a measured distance is calculated based on a combination of result patterns of the first detections and the second detections. This ensures that the distance to the target object is reliably measured even when the target object has a low reflectivity and/or under thick fog conditions, for example.

According to a specific aspect of the present invention, the first detections are based on a rise of a reception level, and the second detections are based on a filtered signal obtained by filtering a received light signal. According to the aspect, relatively intense light reception may be detected based on a rise of the reception level, and relatively less intense light reception may be detected based on a filtered signal obtained by filtering a received light signal.

According to another aspect of the present invention, when the combination of result patterns of the first detections and the second detections indicates at least two light reception determinations made based on the second detections and a single light reception determination made based on one of the first detections, the calculating of a measured distance is performed based on either of the light reception determination made based on the first detection and a second earliest or subsequent one of the light reception determinations made based on one of the second detections. This ensures that the distance to the target object is reliably measured based on a proper light reception determination.

According to yet another aspect of the present invention, when the light reception determination made based on the first detection comes after two light reception determinations made based on the second detections, the calculating of a measured distance is performed based on the light reception determination made based on the first detection. In this case, distance measurement is made based on the light reception determination based on the first detection, and this ensures reliability and precision.

According to yet another aspect of the present invention, when the light reception determination made based on the first detection comes before two light reception determinations made based on the second detections, the calculating of a measured distance is performed based on a later light reception determination of the two light reception determinations made based on the second detections. In this case, distance measurement is made based on the later light reception determination based on one of the second detections, and this ensures reliability and precision.

According to yet another aspect of the present invention, when the light reception determination made based on the first detection comes between first and second earliest light reception determinations made based on the second detections, it is determined, based on a time interval between the first earliest light reception determination made based on one of the second detections and the light reception determination made based on the first detection as well as a time interval between the light reception determination made based on the first detection and the second earliest light reception determination made based on one of the second detections, whether the light reception determination made based on the first detection or the second earliest light reception determination made based on the second detection is to be based on to perform the calculating of a measured distance. In this case, distance measurement is made in view of the time interval between the light reception determination made based on the first detection and the first earliest light reception determination made based on one of the second detections as well as the time interval between the light reception determination made based on the first detection and the second earliest light reception determination made based on one of the second detections. This ensures reliable distance measurement.

According to yet another aspect of the present invention, when the time interval between the first earliest light reception determination made based on one of the second detections and the light reception determination made based on the first detection is longer than the time interval between the light reception determination made based on the first detection and the second earliest light reception determination made based on one of the second detections, the calculating of a measured distance is performed based on the light reception determination made based on the first detection. On the other hand, when the time interval between the first earliest light reception determination made based on one of the second detections and the light reception determination made based on the first detection is shorter than the time interval between the light reception determination made based on the first detection and the second earliest light reception determination made based on one of the second detections, the calculating of a measured distance is performed based on the second earliest light reception determination made based on the second detection. In this case, distance measurement is made in view of the length comparison of the time interval between the light reception determination made based on the first detection and the first earliest light reception determination made based on one of the second detections with the time interval between the light reception determination made based on the first detection and the second earliest light reception determination made based on one of the second detections. This ensures reliable distance measurement.

According to yet another aspect of the present invention, in the first detections, a time point at which a reception level of the reflected light component reaches a threshold is detected as a time point of light reception and, in the second detections, a time point at which a filtered signal obtained by filtering a received light signal of the reflected light component crosses a point of zero is detected as the time point of light reception. In this case, light reception determination is made based on the threshold for reception level in the first detections, and based on the zero-crossing time point in the second detections. This ensures reliable distance measurement.

According to yet another aspect of the present invention, a measured distance is calculated based on a time delay from when light is emitted to the target object until light reception is determined based on any one of the first detections or light reception is determined based on any one of the second detections. Calculating a distance that light travels in the time from when light is emitted until light reception is determined allows accurate distance measurement.

To achieve the above object, a range finder includes: a light receiving element configured to receive a reflected component of light emitted to a target object; a first detection unit and a second detection unit configured to perform two different types of detections for detecting reception of the reflected component with different detection gains; and a calculation unit configured to calculate a measured distance based on a combination of result patterns of the detections performed by the first and second detection units. For a single light emission, each of the first and second detection units performs at least two detections with a time interval.

In the above range finder, each of the first and second detection units, which are configured to perform two different types of detections for detecting reception of a reflected light component with different detection gains, performs at least two detections with a time interval for a single light emission, and a measured distance is calculated based on a combination of result patterns of the detections performed by the first and second detection units. This ensures that the distance to the target object is reliably measured even when the target object has a low reflectivity and/or under thick fog conditions, for example.

According to a specific aspect of the present invention, the first detection unit detects light reception on the light receiving element based on a rise of a reception level, and the second detection unit detects light reception on the light receiving element based on a filtered signal obtained by filtering a received light signal. This ensures that the distance to the target object is reliably measured based on a proper light reception determination.

Effects of the Invention

According to the present invention, it is possible to provide a ranging method and a range finder which allow reliable measurement of the distance to a target object even when the target object has a very low reflectivity and/or under conditions with disturbances.

BRIEF DESCRIPTION OF THE DRAWINGS

FIG. 8 is a flowchart illustrating an example of output selection processing performed by the range finder based on the light reception determinations made by the first and second detection units.

MODE FOR CARRYING OUT THE INVENTION

With reference to the drawings, a range finder according to an embodiment of the present invention, and a ranging method using this range finder will be described below. For example, the range finder according to this embodiment may be applied to a train to check an environment in front of the train for safety while the train is traveling. The range finder according to this embodiment is able to measure the distance to a target object, such as a person, a cargo, an automobile, even when disturbances, such as fog, rain, and/or snow, are included in the range finder's field of view. Hereinafter, a situation in which the range finder according to this embodiment measures the distance to a target object in a foggy environment will be described as one typical example.

Figure 1:
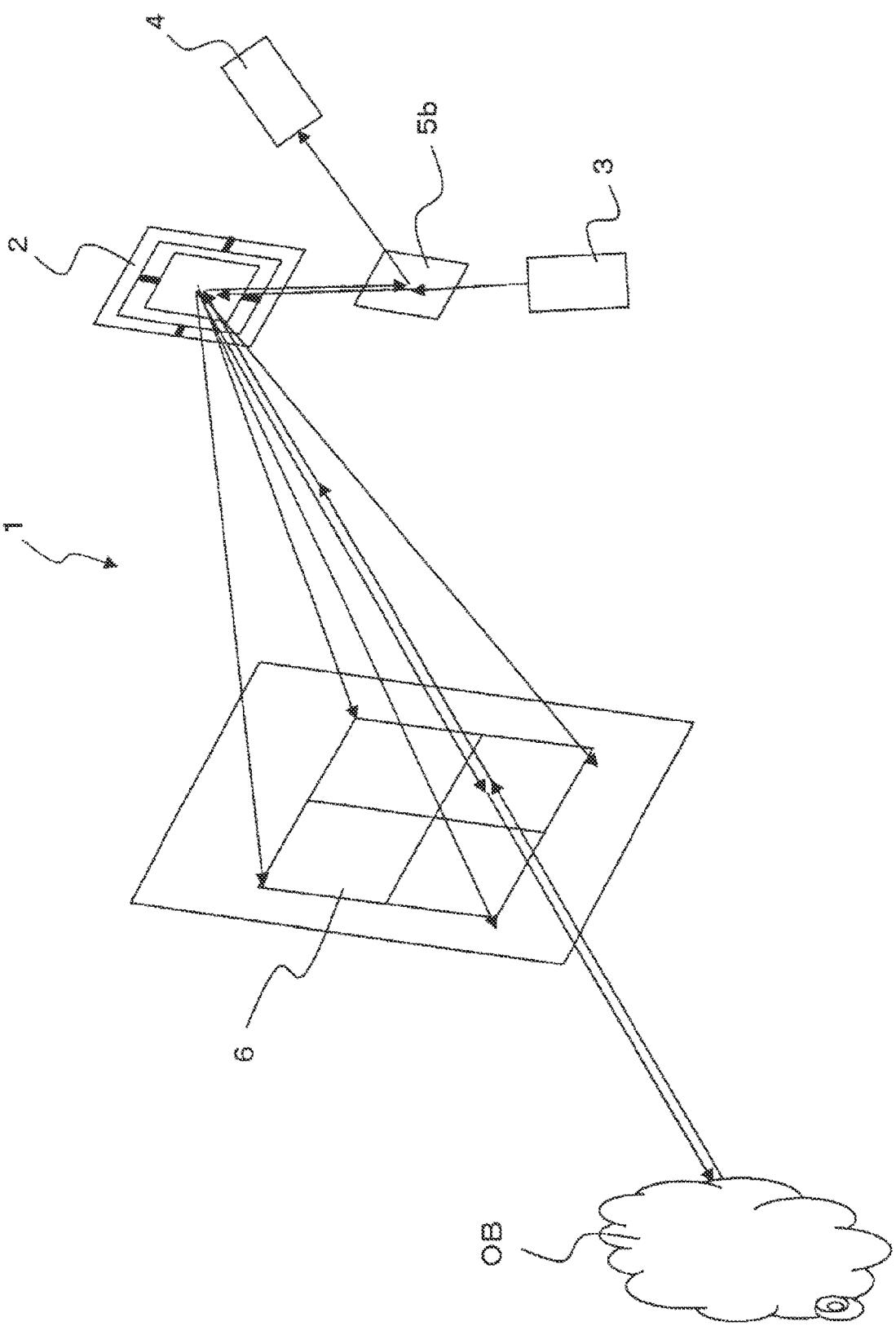
FIG. 1 is a perspective view illustrating an optical system of a range finder according to an embodiment of the present invention.

As illustrated in FIG. 1, a range finder 1 according to this embodiment includes a two-dimensional scanning mirror (scanner) 2, a laser projection unit 3, a laser receiving unit 4, a light projection/reception separator 5b, and a light projection/reception window 6. The light projection/reception window 6 includes a transparent plate such as a glass plate and transmits laser light. Through the light projection/ reception window 6, laser light (pulsed laser) is projected onto a target object OB, and light reflected from the target object OB is received. The range finder 1 determines the distance to the target object OB based on the propagation speed of laser light and a time delay from when the laser projection unit 3 emits the laser light to the target object OB (time point of light emission) until the laser receiving unit 4 receives light reflected from the target object OB (time point of light reception). In other words, the range finder 1 is a distance measurement device based on an optical pulse time-of-flight measurement.

Next, with reference to the block diagrams of FIGS. 2 and 3, a configuration example of the range finder 1 will be described. As illustrated, for example, in FIG. 2, in addition to the above components such as the two-dimensional scanning mirror 2, the range finder 1 further includes a control unit 10 for controlling various operations. The control unit 10 is configured to perform various signal processing and drive control operations, such as drive control of the two-dimensional scanning mirror 2. Among other functional components, the control unit 10 includes a ranging and calculation unit 9 configured to calculate the distance to the target object OB. A specific configuration example of the ranging and calculation unit 9 will be described later with reference to FIG. 3.

Figure 2:
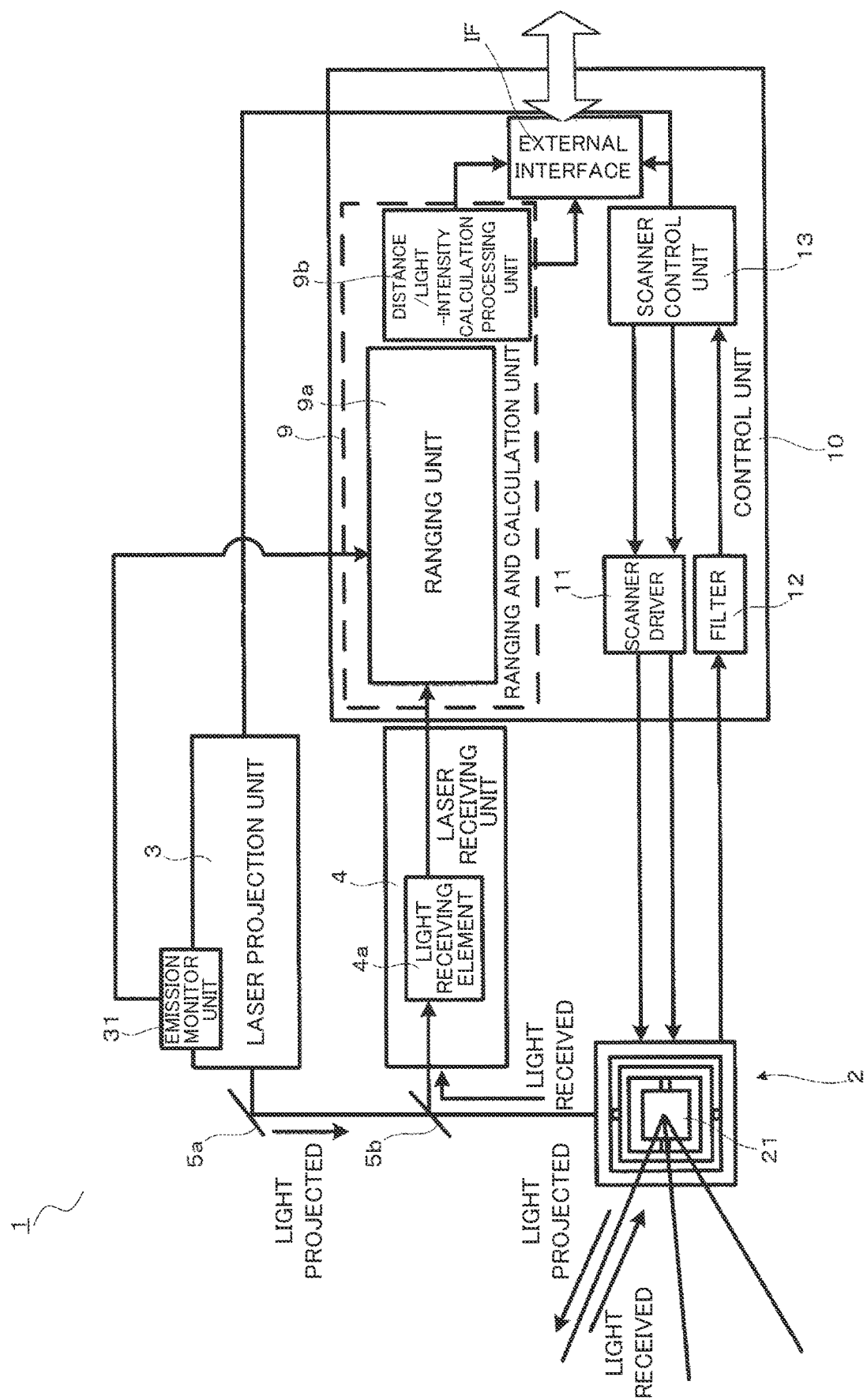
FIG. 2 is a block diagram illustrating a configuration example of the range finder.

As illustrated in FIG. 2, the laser projection unit 3 of the range finder 1 includes, for example, a laser driver, a laser element (semiconductor laser), an optical system for projection including a lens, and is configured to emit laser light (pulsed light). When the range finder 1 scans the target object OB (see FIG. 1), laser light (projection light flux) is emitted from the laser element through the optical system for projection, and is then reflected by a reflective mirror 5a to the light projection/reception separator 5b. After that, the light passes through the light projection/reception separator 5b to the two-dimensional scanning mirror 2, and is then reflected by the two-dimensional scanning mirror 2 onto the surface of the target object OB.

The two-dimensional scanning mirror 2 of the range finder 1 includes, for example, a mirror 21, a frame-shaped movable part, and a beam (torsion bar) that is connected to the movable part so as to serve as a rotation shaft about which the movable part rotates and causes the mirror 21 to vibrate in two dimensions. The target object OB is two-dimensionally scanned with light reflected by the mirror 21 that receives laser light from the laser projection unit 3 while the mirror 21 is changing its position (posture).

The laser light reflected from the target object OB is then reflected by the two-dimensional scanning mirror 2, again. After that, some components of this light are reflected by the light projection/reception separator 5b and received by the laser receiving unit 4.

The laser receiving unit 4 includes a light receiving element (photodiode) 4a for receiving reflected components of laser light emitted to the target object OB, an optical system for reception, a preamplifier, and an A/D converter, for example. The laser receiving unit 4 is configured to convert laser components reflected by the light projection/reception separator 5b (reflected light components) into, for example, a detectable pulse wave, and output the pulse wave to the ranging and calculation unit 9 of the control unit 10.

In addition to the components described above, the laser projection unit 3 further includes an emission monitor unit 31 for monitoring emitted laser light. The emission monitor unit 31 includes, for example, a light receiving element unit (photodiode), and is configured to receive a portion of the emitted laser light (pulsed light) to determine the time point of light emission. Accordingly, the emission monitor unit 31 generates a time measurement start pulse. In addition, the emission monitor unit 31 outputs the generated time measurement start pulse to the ranging and calculation unit 9 of the control unit 10.

The ranging and calculation unit 9 of the control unit 10 includes a ranging unit 9a and a distance/light-intensity calculation processing unit 9b. The ranging unit 9a is configured to measure a time delay of laser light (pulsed light) and the intensity of laser light (pulsed light), based on the time measurement start pulse output from the laser projection unit 3 and based on the pulse wave that is output from the laser receiving unit 4 and that corresponds to the reflected components of the laser light. The distance/light-intensity calculation processing unit 9b is configured to calculate the light intensity and the distance to the target object OB based on the measurements of the ranging unit 9a. In other words, the distance/light-intensity calculation processing unit 9b functions as a calculation unit for calculating a measured distance.

In addition to the ranging and calculation unit 9, the control unit 10 further includes, for example, a scanner driver 11, a filter 12, and a scanner control unit 13. The scanner driver 11 is configured to two-dimensionally drive the two-dimensional scanning mirror 2. The filter 12 is configured to measure the scanner position, which is the position (posture) of the two-dimensional scanning mirror 2. The scanner control unit 13 is configured to transmit a drive signal to the scanner driver 11 and receive a signal indicating the scanner position from the filter 12.

In addition, the control unit 10 is further configured to transmit, through an external interface IF, data regarding the distance and light intensity calculated by the ranging and calculation unit 9 and data regarding the scanner position, which is the position of the two-dimensional scanning mirror 2, acquired by the scanner control unit 13.

Next, with reference to the block diagram of FIG. 3, a configuration example of the ranging and calculation unit 9 described above will be described in more detail.

Figure 3:
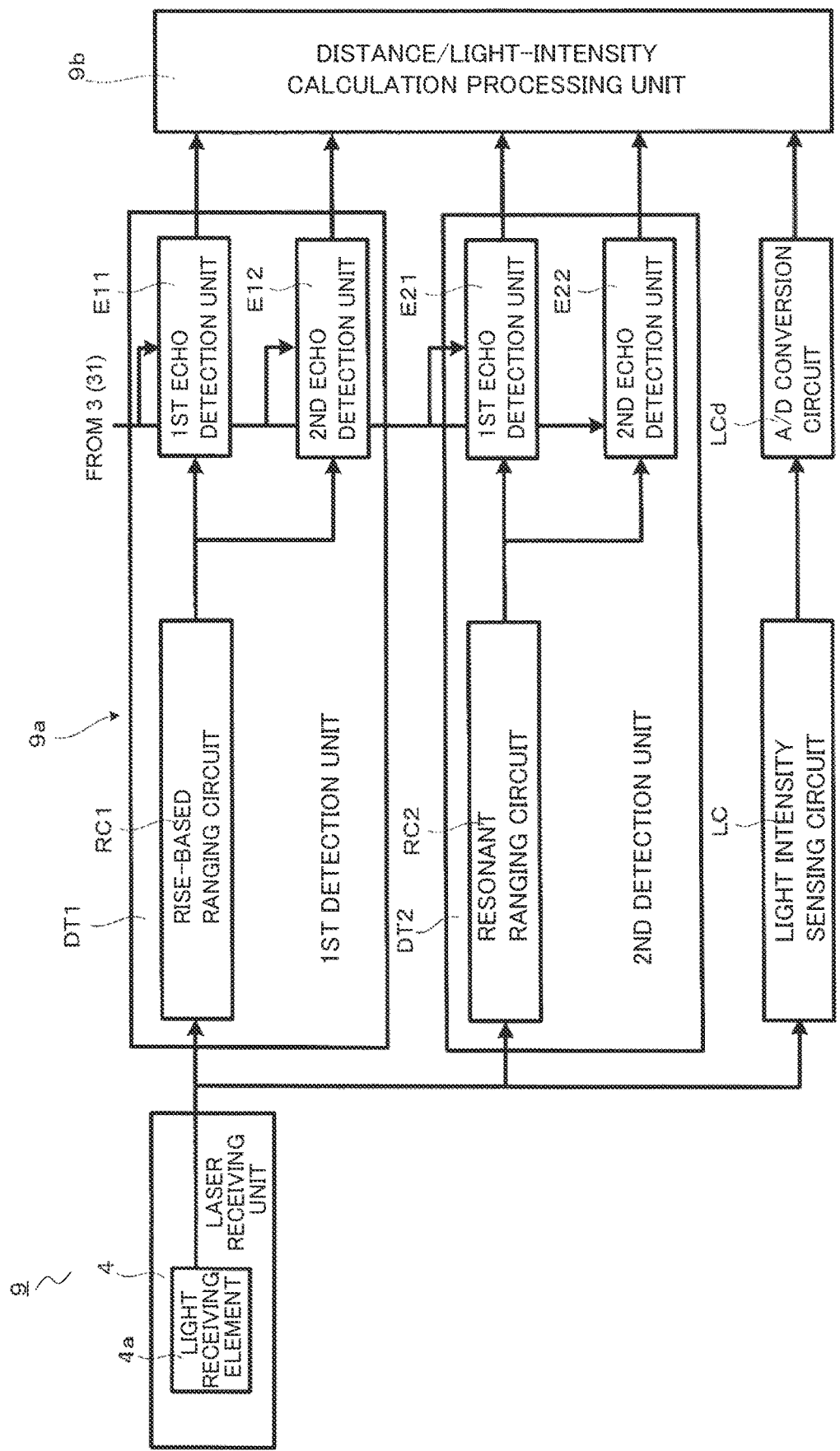
FIG. 3 is a block diagram illustrating a configuration example of a ranging and calculation unit.

As illustrated in FIG. 3, in this embodiment, the ranging unit 9a of the ranging and calculation unit 9 includes a first detection unit DT1 and a second detection unit DT2 configured to perform two different types of detections with different detection gains (perform first detection and second detection) of light reception on the light receiving element (photodiode) 4a of the laser receiving unit 4. The ranging and calculation unit 9 generates a time measurement stop pulse based on the combination of result patterns of the detections performed by the first and second detection units DT1, DT2.

The distance/light-intensity calculation processing unit 9b, which serves as the calculation unit, calculates a measured distance based on the time delay determined using the time measurement start pulse output from the laser projection unit 3 and the time measurement stop pulse generated by the ranging unit 9a.

In particular, according to this embodiment, for a single light emission from the laser projection unit 3, each of the first and second detection units DT1, DT2 performs two detections with a time interval. This allows for generating an accurate and precise time measurement stop pulse even when the target object OB has a low reflectivity and/or under thick fog conditions, for example, thereby ensuring reliable measurement of the distance to the target object OB.

Hereinafter, the configuration of the ranging unit 9a, which includes the first and second detection units DT1, DT2, of the ranging and calculation unit 9 will be described in more detail with reference to FIG. 3.

The first detection unit DT1 of the ranging unit 9a is a high-level light reception detection unit. Specifically, the first detection unit DT1 is configured to detect the reception of light based on the rise of the level of a received light signal that is generated based on light received by the light receiving element 4a, and includes a rise-based ranging circuit RC1. The rise-based ranging circuit RC1 includes a low-gain amplifier and a comparator, for example. The first detection unit DT1 further includes a first echo detection unit E11 and a second echo detection unit E12 to perform two separate first detections with a time interval on the received light signal detected in the rising ranging circuit RC1. Each echo detection unit E11, E12 digitizes a detected time point and transmits this digitized measurement to the distance/light-intensity calculation processing unit 9b, which is the calculation unit for calculating a measured distance.

The second detection unit DT2 of the ranging unit 9a is a low-level light reception detection unit. Specifically, the second detection unit DT2 is configured to detect the reception of light based on a filtered signal obtained by filtering a received light signal that is generated based on light received by the light receiving element 4a, and includes a resonant ranging circuit RC2. The resonant ranging circuit RC2 includes a resonant circuit, a high-gain amplifier, and a comparator, for example. The second detection unit DT2 further includes a first echo detection unit E21 and a second echo detection unit E22 to perform two separate second detections with a time interval on the received light signal detected in the resonant ranging circuit RC2. Each echo detection unit E21, E22 digitizes a detected time point and transmits this digitized measurement to the distance/light-intensity calculation processing unit 9b.

Next, an example detection method used in each detection of the first detection unit DT1 and an example detection method used in each detection of the second detection unit DT2 will be described. As used herein, for each detection, a situation in which reception (light reception) is detected in the detection may also be described as "light reception is determined" or similar expression.

As described above, the first detection unit DT1 is a rising edge-based, high-level light reception detection unit, configured to detect a time point of light reception by detecting a certain level rise in the received waveform, and generate a time measurement stop pulse based on the detection result. In other words, in each detection, the first detection unit DT1 uses the low-gain amplifier to amplify the pulse wave (output signal) from the light receiving element 4a, and uses the comparator to check whether the signal with the amplified waveform crosses a predetermined rising edge detection threshold, thereby identifying whether light reception is determined. In this rising edge-based detection, the time point (edge point) at which the reception level of the reflected light components indicated by the pulse wave from the light receiving element 4a reaches the threshold is detected as the time point of light reception, and the time measurement stop pulse is to be generated at this time point.

On the other hand, the second detection unit DT2 is a low-level light reception detection unit, configured to detect a time point of light reception using a so-called zero-crossing detection technique, and generate a time measurement stop pulse based on the detection result. In other words, in each detection, the second detection unit DT2 uses the resonant circuit to resonate (filter) components of specific frequencies contained in the pulse wave (output signal) from the light receiving element 4a, then extracts these components collectively as a filtered signal, and checks whether the filtered signal crosses the point of zero. In this zero-crossing detection, the time point at which the filtered signal crosses the point of zero is detected as the time point of light reception, and the time measurement stop pulse is to be generated at this time point.

According to this embodiment, for a single light emission from the laser projection unit 3, each detection units DT1, DT2 performs two rounds of the above detection operation. That is, the ranging unit 9a performs four detections in total for each light emission, and may produce up to four light reception determinations accompanied with different time measurement stop pulses. Then, by taking account of the individual detection results and the specific situation in which these detections are carried out, a most appropriate time measurement stop pulse may be selected from these time measurement stop pulses.

In addition to the above detection units DT1, DT2, the ranging and calculation unit 9 further includes a light intensity sensing circuit LC, an A/D conversion circuit LCd, etc. The light intensity sensing circuit LC is configured to measure the intensity of light received by the light receiving element 4a. The A/D conversion circuit LCd is configured to convert the measurement of the light intensity sensing circuit LC into a digital signal and transmits the digital signal to the distance/light-intensity calculation processing unit 9b.

Figure 4:
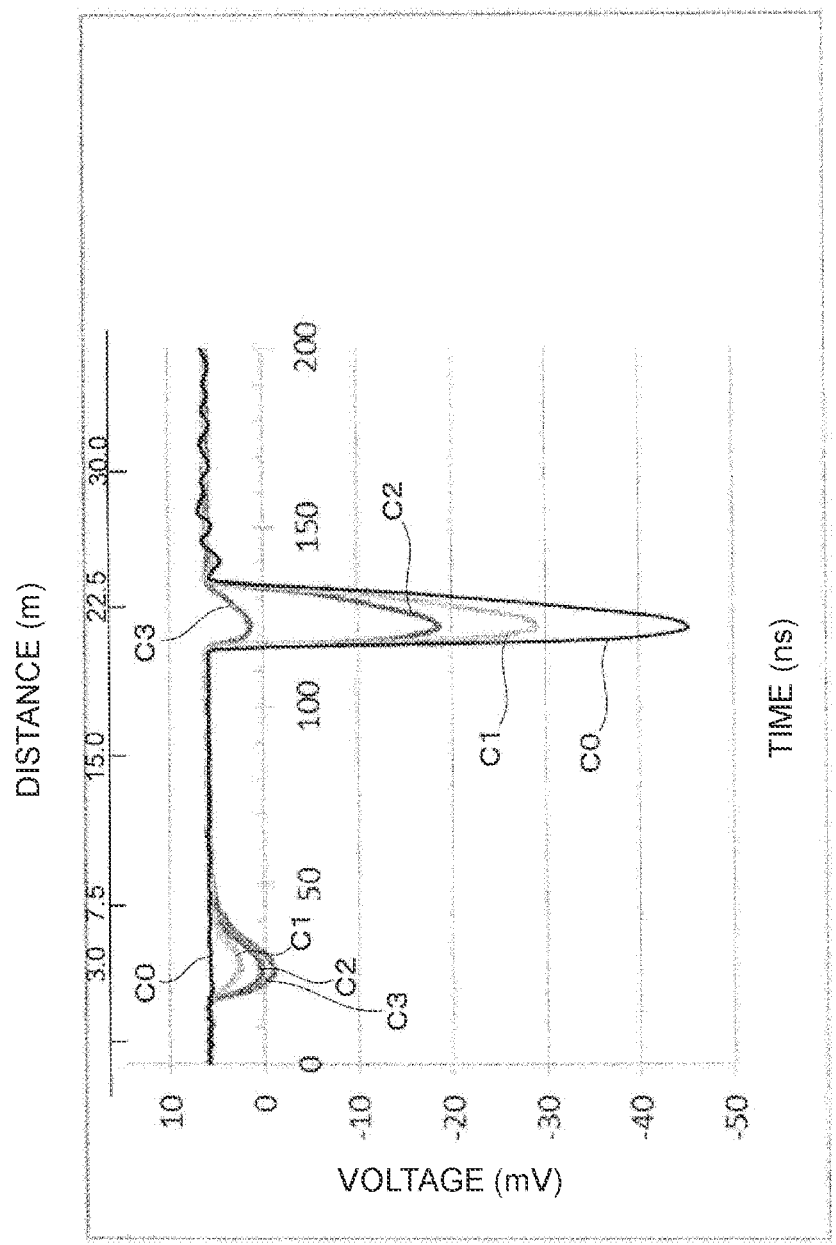
FIG. 4 is a chart illustrating an example of how reflected light components are detected.

Next, with reference to FIG. 4, description will be given of an example experiment to measure the distance to a target object in foggy conditions, which is an example of conditions with disturbances. FIG. 4 is a chart illustrating an example of how reflected light components are detected. Specifically, FIG. 4 illustrates results of an experiment performed under the following conditions. In a space, such as a laboratory, where a foggy atmosphere can be created, the range finder 1 according to this embodiment or a conventional range finder was installed, and a highly reflective object, such as a white wall, was placed as the target object OB at a position approximately 15 m ahead of the range finder. Under the conditions, the ranging experiment was repeated with different fog densities. In FIG. 4, the abscissa represents the distance or the time delay which corresponds to the distance and which was thus measured by a range finder to determine the distance. The ordinate represents the voltage value corresponding to the intensity of reflected light components upon reception. In this example, a more negative voltage value indicates a greater intensity of the received light signal.

Among curves C0 to C3 in FIG. 4, curve C0 shows the change of voltage level under non-foggy conditions. As illustrated in FIG. 4, curve C0 has a waveform having a single intense peak at a point corresponding to the location of the target object OB. This indicates that, under such non-foggy conditions, the location of the target object OB may be detected simply by locating that peak. When the range finder 1 according to this embodiment is used under such conditions corresponding to curve C0, the two detections of each detection unit DT1, DT2 will produce a single light reception determination (single echo).

Curve C1 shows the change of voltage level under foggy conditions with a visibility of 200 m, i.e., foggy conditions in which an environment up to 200 m ahead of a person may be discerned by the naked eye. Curves C2 and C3 show the change of voltage level under foggy conditions with visibilities of 100 m and 50 m, respectively. Practically, train operation will be nearly impossible under the foggy conditions with a visibility of 50 m.

As is clear from FIG. 4, the thicker the fog, the less intense the peak at the point corresponding to the location of the target object OB. This means that a thicker fog causes a greater decrease in the intensity of the received light signal. FIG. 4 also shows that, under foggy conditions, a different peak was generated at a point nearer the range finder than the location of the target object OB in the waveform, and the thicker the fog, the more intense this different peak. This different peak is presumed to be due to the detection of light components reflected from the fog. It is known that, as illustrated in FIG. 4, this fog-induced peak increases as the fog thickens, but the location of the fog-induced peak (and the resultant detected distance) does not change much as the fog thickens. When the range finder 1 according to this embodiment is used under such conditions corresponding to curves C1 to C3, the two detections of at least one of the detection units DT1, DT2 will produce two light reception determinations (dual echo).

In such a dual echo, among two individual light reception determinations made by the two detections, light reception detected earlier is presumed to be reception of light reflected from the fog, and light reception detected later is presumed to be reception of reflected light of interest that indicates the location of the target object OB. Thus, in the dual echo, it is of great significance to accurately determine the exact time of the later light reception.

In addition, it is expected that the intensity of the peak corresponding to the detected position of the target object OB in the waveform decreases as the target object OB is located further away from the range finder. Furthermore, it is also expected that, the distance from the range finder to the target object OB being the same, the intensity of the peak corresponding to the target object OB in the waveform decreases as the reflectivity of the target object OB decreases. Thus, how the target object OB is detected may vary depending on different situations. As such, in order to make proper determinations according to different situations, it is necessary to identify the characteristics of the detection units DT1, DT2.

Figure 5:
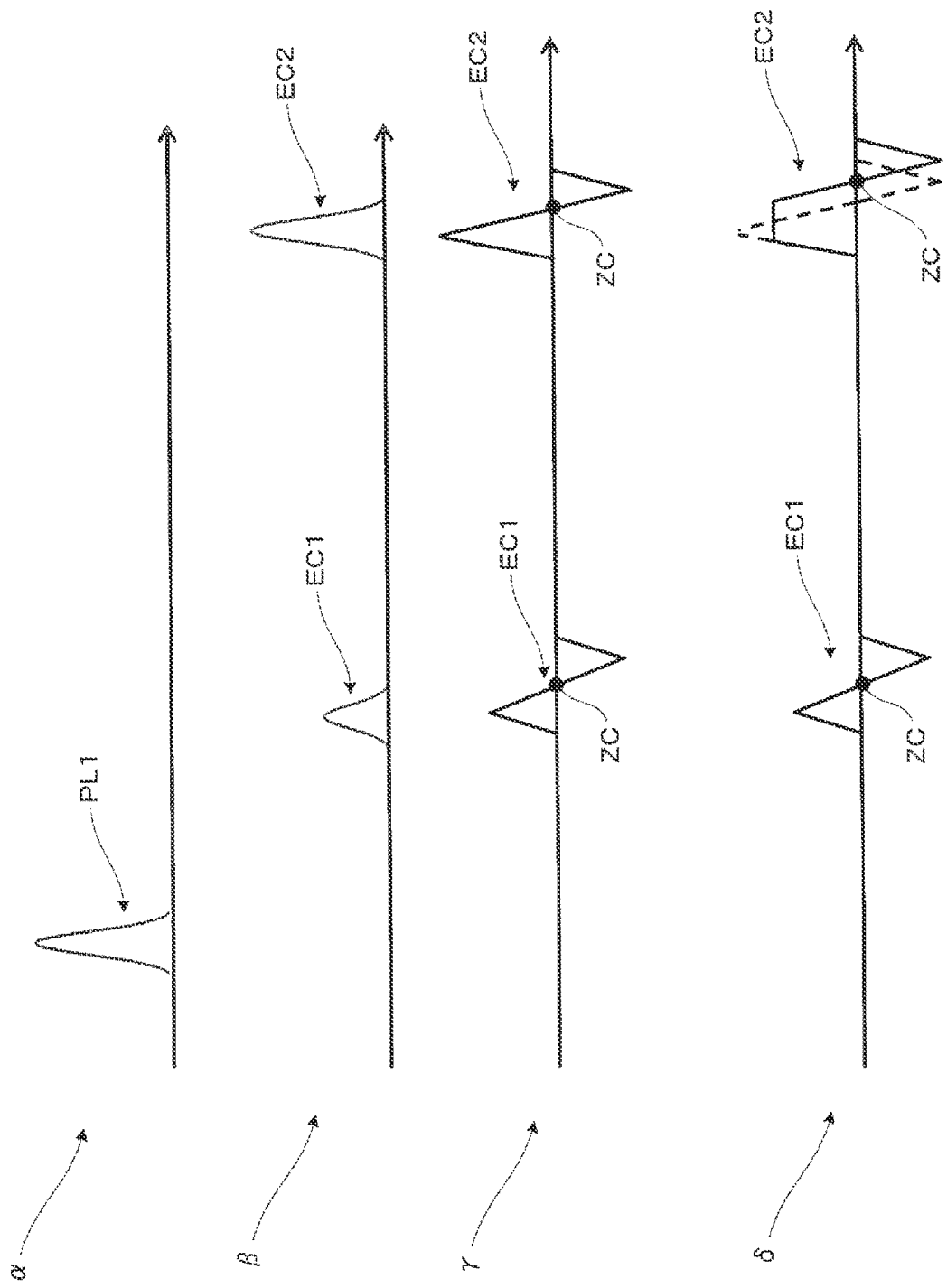
FIG. 5 shows conceptual waveform charts illustrating how reflected light components are received.

Next, referring to FIG. 5, the characteristics of the detection units DT1, DT2 in the ranging and calculation unit 9 will be described. FIG. 5 shows conceptual charts illustrating how reflected light components are received. In FIG. 5, waveform α conceptually illustrates an example of how laser light (pulsed light) PL1 is detected by the emission monitor unit 31 of the laser projection unit 3. Waveform β conceptually illustrates an example form of a received light signal used for detections by the first detection unit DT1. Each waveform γ, δ conceptually illustrates an example form of a received light signal used for detections by the second detection unit DT2. Here, as illustrated in FIG. 5, it is assumed that due to, for example, foggy conditions, etc., a single light emission represented by waveform α results in the reflection (first echo) EC1 from the fog and the reflection (second echo) EC2 from a target object.

As described above, the first detection unit DT1 is a high-level light reception detection unit, configured to detect a time point of light reception by detecting a certain level rise of the received light signal. Thus, the first detection unit DT1 detects only a relatively intense signal rise that exceeds the threshold. As such, when the first detection unit DT1 performs detections based on a signal which contains the first and second echoes EC1, EC2 as illustrated in waveform β of FIG. 5, the first detection unit DT1 may only detect the second echo EC2, corresponding to the higher peak, without detecting the first echo EC1, corresponding to the lower peak. However, considering that the first detection unit DT1 is configured to detect a relatively intense rise in the waveform of the received light signal, any light reception determination by the first detection unit DT1 is expected to indicate an accurate time point of light reception, and thus accurately indicate when to generate the time measurement stop pulse.

On the other hand, as also described above, the second detection unit DT2 is a low-level light reception detection unit, configured to detect a time point of light reception by detecting the zero-crossing point ZC of a signal obtained by using the resonant circuit to resonate components of specific frequencies of the received light signal i.e., by detecting the zero-crossing point ZC of a filtered received light signal. That is, by using resonance, the second detection unit DT2 is able to reliably detect even a relatively less intense rise of the received light signal. As such, when the second detection unit DT2 performs detections based on a signal which contains the first and second echoes EC1, EC2 as illustrated in waveform γ of FIG. 5, the second detection unit DT2 may detect both the first and second echoes EC1, EC2. However, too intense rise of the received light signal may saturate the output of the resonant circuit. As a result of saturation, the second echo EC2 may be deformed to have a waveform that is quite different from a proper waveform indicated by the dashed line in waveform δ, for example. In this case, the zero-crossing point ZC may shift and may result in inaccurate time measurement. In the example of FIG. 5, the time measurement stop pulse may be generated with an unwanted delay from the actual time point of light reception.

In view of the above characteristics, in this embodiment, two detections are performed by each of the first and second detection units DT1, DT2, and it is determined which one of the different time measurement stop pulses or the corresponding echoes resulting from these detections should be used to calculate a distance estimate.

Hereinafter, with reference to FIG. 6, several possible waveform patterns of the received light signal (the reflected components of the laser light) will be described.

Figure 6:
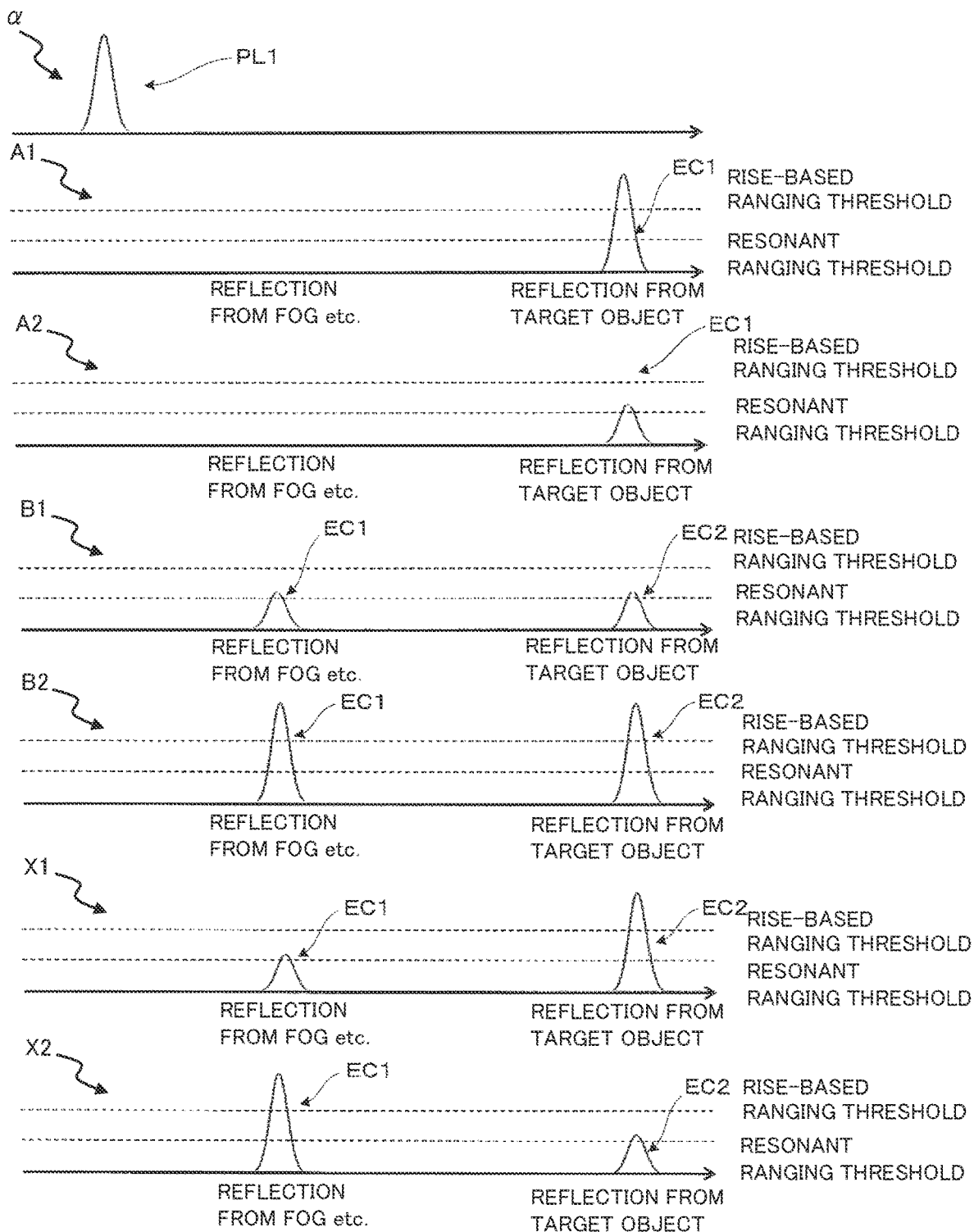
FIG. 6 shows waveform charts illustrating example detection result patterns of reflected light components.

In FIG. 6, waveform α conceptually illustrates how laser light (pulsed light) PL1 is detected by the emission monitor unit 31 of the laser projection unit 3, as in FIG. 5. In other words, waveform α indicates the time measurement start pulse. The other waveforms A1, A2, B1, B2, X1, and X2 are practically probable waveform examples of a received light signal. In FIG. 6, a rise-based ranging threshold and a resonant ranging threshold are indicated by virtual lines. As used herein, the "rise-based ranging threshold" refers to a threshold based on which the first detection unit DT1 performs rising edge-based detection to determine light reception, and the "resonant ranging threshold" refers to a threshold based on which the second detection unit DT2 performs resonance-based zero-crossing detection to determine light reception. In other words, the detection units DT1, DT2 determine light reception at signal peaks equal to or greater than their individual thresholds in the waveform. Specifically, the rise-based ranging threshold, which is used for high-level light reception detection by the first detection unit DT1, is higher than the resonant ranging threshold, which is used for low-level light reception detection by the second detection unit DT2.

As illustrated as waveform A1, one probable waveform of a signal based on light received by the light receiving element 4a may contain only the first echo EC1 having a relatively high peak. Such a waveform may typically be obtained when the distance to the target object OB having a high reflectivity is measured under non-foggy or very thin fog conditions in which no light component will be reflected from the fog.

As illustrated as waveform A2, another probable waveform of a signal based on light received by the light receiving element 4a may contain only the first echo EC1 having a relatively low peak. Such a waveform may typically be obtained when the distance to the target object OB having a low reflectivity is measured under non-foggy conditions or very thin fog conditions in which no light component will be reflected from the fog.

As illustrated as waveform B1, another probable waveform of a signal based on light received by the light receiving element 4a may contain the first echo EC1 and second echo EC2, each of which has a relatively low peak. Such a waveform may typically be obtained when the distance to the target object OB having a low reflectivity is measured under medium fog conditions.

As illustrated as waveform B2, another probable waveform of a signal based on light received by the light receiving element 4a may contain the first echo EC1 and second echo EC2, each of which has a relatively high peak. Such a waveform may typically be obtained when the distance to the target object OB having a high reflectivity is measured under above-medium fog conditions.

As illustrated as waveform X1, another probable waveform of a signal based on light received by the light receiving element 4a may contain the first echo EC1 having a relatively low peak and the second echo EC2 having a relatively high peak. Such a waveform may typically be obtained when the distance to the target object OB having a high reflectivity is measured under medium fog conditions.

Finally, as illustrated as waveform X2, another probable waveform of a signal based on light received by the light receiving element 4a may contain the first echo EC1 having a relatively high peak and the second echo EC2 having a relatively low peak. Such a waveform may typically be obtained when the distance to the target object OB having a low reflectivity is measured under above-medium fog conditions.

To summarize the above, three patterns are assumed based on the following fog conditions: substantially non-foggy conditions, in which no light component will be reflected from the fog (second echo EC2: ND); medium fog conditions (first echo EC1: Low); and above-medium fog conditions, in which many light components will be reflected from the fog (first echo EC1: High). In addition, two patterns are assumed based on the following target-object types: one having a low reflectivity (first echo EC1 or second echo EC2: Low) and one having a high reflectivity (first echo EC1 or second echo EC2: High). The six probable cases (situations) described above may be derived from these assumptions.

Hereinafter, with reference to the time series charts in FIG. 7, how light reception determinations are made based on detections performed in a two-by-one manner by the first and second detection units DT1, DT2, for the six situations described above.

Figure 7:
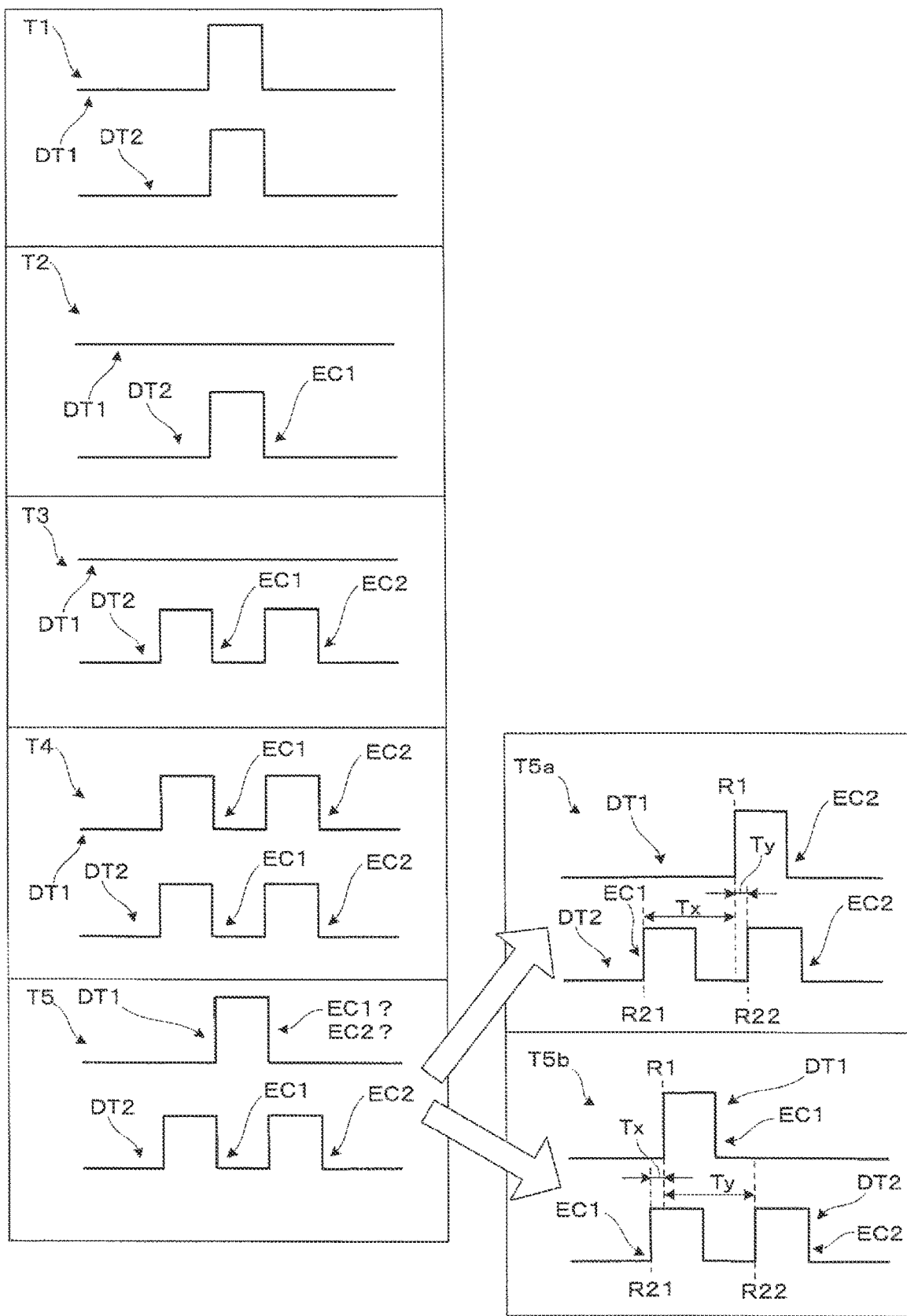
FIG. 7 shows time series charts illustrating details of light reception determinations made by the first and second detection units based on different detection result patterns of reflected light components.

FIG. 7 illustrates details of light reception determinations made by the first and second detection units DT1, DT2 based on different detection result patterns of reflected light components. In FIG. 7, time series charts T1 to T4 correspond to the four situations represented by waveforms A1, A2, B1, and B2, respectively, from among the six situations illustrated in FIG. 6. Time series chart T5 may correspond to the two situations represented by waveforms X1, X2 from among the six situations. Time series chart T5 may be further classified into time series chart T5a, corresponding to a probable situation represented by waveform X1, and time series chart T5b, corresponding to a probable situation represented by waveform X2. Time series charts T5a, T5b will be described in more detail later.

In each time series chart T1 to T5, T5a, and T5b, the upper section illustrates light reception determinations based on detections by the first detection unit DT1, and the lower section illustrates light reception determinations based on detections by the second detection unit DT2. In other words, each ON-pulse in the time series charts indicates a time point when light reception is determined. This also corresponds to determination whether a peak in the waveform exceeds the thresholds illustrated in FIG. 6.

Time series chart T1 corresponds to the situation represented by waveform A1 in FIG. 6. Waveform A1 contains the first echo EC1 having a relatively high peak, and each of the first and second detection units DT1, DT2 makes a single light reception determination (single echo) based on the detection of the first echo EC1. In this case, however, the light reception determination made by the second detection unit DT2 may be inaccurate due to the saturation of the resonant circuit output. Thus, in this case, the time point of light reception (time measurement stop pulse) determined based on the detection made by the first detection unit DT1 is finally adopted, so that accurate time measurement is ensured.

Time series chart T2 corresponds to the situation represented by waveform A2 in FIG. 6. Waveform A2 contains the first echo EC1 having a relatively low peak, and only the second detection unit DT2 makes a single light reception determination (single echo) based on the detection of the first echo EC1. In this case, the time point of light reception (time measurement stop pulse) determined based on this detection made by the second detection unit DT2 is finally adopted.

Time series chart T3 corresponds to the situation represented by waveform B1 in FIG. 6. Waveform B1 contains the first echo EC1 and second echo EC2, each of which has a relatively low peak, and only the second detection unit DT2 makes two light reception determinations (dual echo) based on the detections of the echoes EC1, EC2. In this case, the time point of light reception (time measurement stop pulse) determined based on the later detection made by the second detection unit DT2 is finally adopted.

Time series chart T4 corresponds to the situation represented by waveform B2 in FIG. 6. Waveform B2 contains the first echo EC1 and second echo EC2, each of which has a relatively high peak, and each of the first and second detection units DT1, DT2 makes two light reception determinations (dual echo) based on the detections of the echoes EC1, EC2. In this case, however, the light reception determinations made by the second detection unit DT2 may be inaccurate due to the saturation of the resonant circuit output. Thus, in this case, the time point of light reception (time measurement stop pulse) determined based on the later detection made by the first detection unit DT1 is finally adopted.

As described above, time series chart T5 corresponds to the situations represented by waveforms X1, X2 in FIG. 6. Either based on waveform X1 or X2, the first detection unit DT1 makes a single light reception determination (single echo) and the second detection unit DT2 makes two light reception determinations (dual echo). In other words, in this case, simply identifying the number of light reception determinations made by the first and second detection units DT1, DT2, for example, is not sufficient to distinguish whether the received waveform corresponds to waveform X1 or X2. Typically, in this case, the light reception determination of the first detection unit DT1 may come between the two light reception determinations of the second detection unit DT2, as illustrated in FIG. 7.

If this typical case has occurred in the situation represented by waveform X1, which contains the first echo EC1 having a relatively low peak and the second echo EC2 having a relatively high peak, the single light reception determination made by the first detection unit DT1 is presumed to be determination made based on the detection of the second echo EC2. Thus, in this case, the time point when the light reception determination is made by the first detection unit DT1 is expected to be close to the time point when the later light reception determination is made by the second detection unit DT2. On the other hand, if the above typical case has occurred in the situation represented by waveform X2, the time point when the light reception determination is made by the first detection unit DT1 is expected to be close to the time point when the earlier light reception determination is made by the second detection unit DT2. Thus, when light reception determinations as illustrated in the time series chart T5 are produced, it is determined whether the received waveform corresponds to waveform X1 or X2 based on the time intervals between the light reception determination by the first detection unit DT1 and the two light reception determinations by the second detection unit DT2, as illustrated in time series charts T5a, T5b.

This will be detailed below. Here, the time point at which the light reception determination is made by the first detection unit DT1 will be indicated by R1, the time point at which the earlier light reception determination is made by the second detection unit DT2 will be indicated by R21, the time point at which the later light reception determination is made by the second detection unit DT2 will be indicated by R22. When, as illustrated, for example, in time series chart T5a, the interval Tx between the time point R21 and the time point R1 is longer than the interval Ty between the time point R1 and the time point R22, it is determined that the received waveform corresponds to waveform X1, and the time point R1 of light reception (time measurement stop pulse) determined based on the detection made by the first detection unit DT1 is finally adopted. Specifically, in this case, although the second echo EC2, i.e., the later detection, made by the second detection unit DT2 also indicates light reflected from the target object OB, this may be inaccurate due to the saturation of the resonant circuit output. Thus, in this case, the time point of light reception (time measurement stop pulse) determined based on the detection made by the first detection unit DT1 is finally adopted.

On the other hand, when, as illustrated in time series chart T5b, the interval Tx is shorter than the interval Ty, it is determined that the received waveform corresponds to waveform X2, and the time point R22 of light reception (time measurement stop pulse) determined based on the later detection made by the second detection unit DT2 is finally adopted.

As described above, this embodiment allows reliable distance measurement based on the length comparison of the time interval between the light reception determination made by the first detection unit DT1 and the earlier light reception determination made by the second detection unit DT2 with the time interval between the light reception determination made by the first detection unit DT1 and the later light reception determination made by the second detection unit DT2.

Next, with reference to the flowchart of FIG. 8, an example of output selection processing performed by the range finder 1 based on the light reception determinations made by the first and second detection units DT1, DT2 will be described.

Upon receiving a received light signal from the laser receiving unit 4 (light receiving element 4a), the ranging and calculation unit 9 first determines whether the second detection unit DT2 has made a single light reception determination with respect to detections performed in a two-by-one manner by the first and second detection units DT1, DT2 (step S101). When the ranging and calculation unit 9 determines in step S101 that the second detection unit DT2 has made a single light reception determination (step S101: Yes), the ranging and calculation unit 9 further determines whether the first detection unit DT1 has made a (single) light reception determination (step S102). When the ranging and calculation unit 9 determines in step S102 that the first detection unit DT1 has made a light reception determination (step S102: Yes), the ranging and calculation unit 9 then determines that the received waveform corresponds to waveform A1 of FIG. 6, which corresponds to the time chart T1 of FIG. 7. Thus, the ranging and calculation unit 9 finally adopts the time point of light reception (time measurement stop pulse) determined based on the detection made by the first detection unit DT1, and calculates a measured distance based on this time point of light reception (step S103).

On the other hand, when the ranging and calculation unit 9 determines in step S102 that the first detection unit DT1 has made no light reception determination (step S102: No), the ranging and calculation unit 9 then determines that the received waveform corresponds to waveform A2 of FIG. 6, which corresponds to the time chart T2 of FIG. 7. Thus, the ranging and calculation unit 9 finally adopts the time point of light reception (time measurement stop pulse) determined based on the detection made by the second detection unit DT2, and calculates a measured distance based on this time point of light reception (step S104).

When the ranging and calculation unit 9 determines in step S101 that the second detection unit DT2 has made two light reception determinations, rather than a single light reception determination (step S101: No), the ranging and calculation unit 9 further determines whether the first detection unit DT1 has made at least one light reception determination (step S105). When the ranging and calculation unit 9 determines in step S105 that the first detection unit DT1 has made no light reception determination (step S105: No), the ranging and calculation unit 9 then determines that the received waveform corresponds to waveform B1 of FIG. 6, which corresponds to the time chart T3 of FIG. 7. Thus, the ranging and calculation unit 9 finally adopts the time point of light reception (time measurement stop pulse) determined based on the later detection made by the second detection unit DT2, and calculates a measured distance based on this time point of light reception (step S106).

When the ranging and calculation unit 9 determines in step S105 that the first detection unit DT1 has made at least one light reception determination (step S105: Yes), the ranging and calculation unit 9 further determines whether the at least one light reception determination made by the first detection unit DT1 is a single light reception determination (step S107). When the ranging and calculation unit 9 determines in step S107 that the first detection unit DT1 has made two light reception determinations, rather than a single light reception determination (step S107: No), the ranging and calculation unit 9 then determines that the received waveform corresponds to waveform B2 of FIG. 6, which corresponds to the time chart T4 of FIG. 7. Thus, the ranging and calculation unit 9 finally adopts the time point of light reception (time measurement stop pulse) determined based on the later detection made by the first detection unit DT1, and calculates a measured distance based on this time point of light reception (step S108).

When the ranging and calculation unit 9 determines in step S107 that the first detection unit DT1 has made a single light reception determination (step S107: Yes), i.e., when the ranging and calculation unit 9 determines that the first detection unit DT1 has made a single light reception determination and the second detection unit DT2 has made two light reception determinations, the ranging and calculation unit 9 then determines that the received waveform corresponds to the time chart T5 of FIG. 7, and checks the time intervals between the light reception determinations (step S109). Specifically, in step S109, the ranging and calculation unit 9 determines whether the time interval Tx is longer than the time interval Ty. When the ranging and calculation unit 9 determines in step S109 that the time interval Tx is longer than the time interval Ty (step S109: Yes), the ranging and calculation unit 9 then determines that the received waveform corresponds to waveform X1 of FIG. 6, which corresponds to the time chart T5a of FIG. 7. Thus, the ranging and calculation unit 9 finally adopts the time point of light reception (time measurement stop pulse) determined based on the detection made by the first detection unit DT1, and calculates a measured distance based on this time point of light reception (step S110).

When the ranging and calculation unit 9 determines in step S109 that the time interval Tx is not longer than the time interval Ty (step S109: No), the ranging and calculation unit 9 then determines that the received waveform corresponds to waveform X2 of FIG. 6, which corresponds to the time chart T5b of FIG. 7. Thus, the ranging and calculation unit 9 finally adopts the time point of light reception (time measurement stop pulse) determined based on the later detection made by the second detection unit DT2, and calculates a measured distance based on this time point of light reception (step S111).

As described above, according to this embodiment, when, for example, the combination of result patterns of the first detections and the second detections indicates at least two light reception determinations made by the second detection unit DT2 and a single light reception determination made by the first detection unit DT1, a measured distance is calculated based on either the light reception determination of the first detection unit DT1 or the second earliest light reception determination of the second detection unit DT2. Furthermore, when the light reception determination of the first detection unit DT1 comes between the first and second earliest light reception determinations of the second detection unit DT2, it is further determined, based on time intervals Tx and Ty between the light reception determination made by the first detection unit DT1 and the light reception determinations made by the second detection unit DT2, whether the light reception determination of the first detection unit DT1 or the second earliest light reception determination of the second detection unit DT2 is to be used to calculate a measured distance. This ensures an accurate calculation of a measured distance.

Here, as an alternative, the light reception determination of the first detection unit DT1 may come after both the two light reception determinations of the second detection unit DT2, for example. In this case, the ranging and calculation unit 9 determines in step S109 that the time interval Tx is longer than the time interval Ty (step S109: Yes), and calculates a measured distance based on the time point of light reception determined by the first detection unit DT1. As a still alternative, the light reception determination of the first detection unit DT1 may come before both the two light reception determinations of the second detection unit DT2, for example. In this case, the ranging and calculation unit 9 determines in step S109 that the time interval Tx is not longer than the time interval Ty (step S109: No), and calculates a measured distance based on the time point of light reception determined based on the later detection made by the second detection unit DT2.

As described above, in the range finder 1 and the ranging method using the range finder 1 according to this embodiment, the first and second detection units DT1, DT2, which are included in the ranging unit 9a of the ranging and calculation unit 9, are configured to perform first and second detections of different detection gains, respectively. Furthermore, for a single light emission, each of the first and second detection units DT1, DT2 performs at least two detections with a time interval. Then, based on a combination of result patterns of the first and second detection units DT1, DT2, the distance/light-intensity calculation processing unit 9b, which serves as the calculation unit, calculates a measured distance. This ensures that the distance to the target object is reliably measured even when the target object has a low reflectivity and/or under thick fog conditions, for example.

OTHER EMBODIMENTS

The present invention is not limited to the above embodiment. Rather, the present invention may be implemented in various different forms without departing from the spirit of the present invention.

In the above embodiment, for a single light emission, two detections are performed by each of the first and second detection units DT1, DT2, and it is determined which one of the different time measurement stop pulses or the corresponding echoes resulting from these detections should be finally adopted. However, the number of detections is not limited to two, and may be three or more. Furthermore, although foggy conditions have been used as an example of conditions with disturbances, the present invention may also be applied to conditions with other disturbances such as rain and snow.

Furthermore, although the above description relates to detection results of each pixel in the two-dimensional scanning mirror 2, detection results of all or some of the pixels of the entire scanning area, i.e., detection results over a two-dimensional area, may be processed collectively using labeling or other techniques. In this case, the characteristics of the disturbance may be determined based on the resultant two-dimensional pattern.

It has been described that the range finder 1 may be applied to a train to check an environment in front of the train for safety while the train is traveling under conditions in which disturbances such as fog, rain, snow may sometimes be included in the range finder's field of view. However, the present invention is not limited to this. The range finder according to the present invention may also be used in other outdoor applications such as door-jamming detection, surrounding environment detection, and obstacle detection.

In the above embodiment, an electromagnetically driven two-dimensional galvanometer mirror may be used as an optical scanning unit in the two-dimensional scanning mirror 2, for example. However, the present invention is not limited to this. The present invention may use any optical scanning unit configured to swing a movable part having a light reflecting surface using a drive method such as electromagnetic drive, electrostatic drive, piezoelectric drive, or thermal drive.

REFERENCE SYMBOL LIST

1 Range finder
2 Two-dimensional scanning mirror (Scanner)
3 Laser projection unit
4 Laser receiving unit
4a Light receiving element
5a Reflective mirror
5b Light projection/reception separator
6 Light projection/reception window
9 Ranging and calculation unit
9a Ranging unit
9b Distance/light-intensity calculation processing unit
10 Control unit
11 Scanner driver
31 Emission monitor unit
12 Filter
13 Scanner control unit
21 Mirror
A1, A2, B1, B2, X1, X2 Waveform
C0-C3 Curve
DT1 First detection unit
DT2 Second detection unit
E11, E12, E21, E22 Echo detection unit
EC1 First echo
EC2 Second echo
IF External interface
LC Light intensity sensing circuit
OB Target object
PL1 Laser light (Pulsed light)
R1, R21, R22 Time point of light reception determination
RC1 Rise-based ranging circuit
RC2 Resonant ranging circuit
T1-T5, T5a, T5b Time series chart
Tx, Ty Time interval
α-δ Waveform

The invention claimed is:

1. A ranging method, comprising:
emitting light to a target object to start a time measurement;
amplifying a received light signal of light reflected from the target object with a first gain, and detecting a first signal;
detecting a first echo and a second echo with a time interval from the detected first signal;
amplifying the received light signal of light reflected from the target object with a second gain which is greater than the first gain, and detecting a second signal;
detecting a third echo and a fourth echo with a time interval from the detected second signal;
stopping the time measurement based on a combination of the first and second echoes and the third and fourth echoes, wherein:
in response to a time interval between a time point of the third echo detection and a time point of the first echo detection, being greater than a time interval between the time point of the first echo detection and a time point of the fourth echo detection, the time measurement is stopped at the time point of the first echo detection; and
in response to the time interval between the time point of the third echo detection and the time point of the first echo detection, being smaller than a time interval between the time point of the first echo detection and the time point of the fourth echo detection, the time measurement is stopped at the time point of the fourth echo detection; and
calculating a distance to the target object based on a time interval from the starting of the time measurement to the stopping of the time measurement.

2. The ranging method according to claim 1, wherein detecting the first signal includes a high-level light reception detection which is performed based on a rise of a reception level, and
wherein detecting the second signal includes a low-level reception detection which is performed based on a filtered signal obtained by filtering a received light signal.

3. The ranging method according to claim 2, wherein detecting the first signal is performed at a time point of light reception at which a reception level of a reflected component reaches a threshold, and
wherein detecting the second signal is performed at a time point of light reception at which the filtered signal obtained by filtering the received light signal of the reflected component crosses a point of zero.

4. A range finder, comprising:
a projection unit configured to emit light to a target object and to start a time measurement of light emission;
a receiving unit configured to receive a reflected component of light emitted to the target object from the projection unit;
a rise-based ranging circuit configured to amplify a received light signal of the receiving unit with a first gain to detect an amplified signal;
a first echo detection unit and a second echo detection unit configured to perform detections with a time interval for the received light signal detected in the rise-based ranging circuit;
a resonant ranging circuit configured to amplify the received light signal of the receiving unit with a second gain which is greater than the first gain to detect the amplified signal;
a third echo detection unit and a fourth echo detection unit configured to perform detections with a time interval for the received light signal detected in the resonant ranging circuit; and
a calculation unit configured to calculate a measured distance based on a combination of waveforms detected by the first echo detection unit and the second echo detection unit and waveforms detected by the third echo detection unit and the fourth echo detection unit,
wherein:
the calculation unit is configured to stop the time measurement at a time point of a first echo detection, in response to a time interval between a time point of a third echo detection and a time point of the first echo detection, being greater than a time interval between the time point of the first echo detection and a time point of a fourth echo detection;
the calculation unit is configured to stop the time measurement at the time point of the fourth echo detection, in response to the time interval between the time point of the third echo detection and the time point of the first echo detection, being smaller than the time interval between the time point of the first echo detection and the time point of the fourth echo detection; and the calculation unit is configured to calculate the measured distance based on a time interval from the start of the time measurement to a stop of the time measurement.

5. The range finder according to claim 4,
wherein the rise-based ranging circuit is for high-level light reception detection, and the rise-based ranging circuit is configured to detect a time point of light reception based on a rise of a reception level, and
wherein the resonant ranging circuit is for low-level light reception detection, and the resonant ranging circuit is configured to detect a time point of light reception at which a filtered signal obtained by filtering a received light signal crosses a point of zero.

6. The range finder according to claim 5,
wherein the rise-based ranging circuit includes: a low-gain amplifier for amplifying the received light signal received at the receiving unit; and a first comparator for determining whether the received light signal amplified by the low-gain amplifier crosses a first threshold, and
wherein the resonant ranging circuit includes: a resonant circuit for resonating components of specific frequencies contained in the light signal received at the receiving unit; a high-gain amplifier for amplifying an output signal from the resonant circuit; and a second comparator for determining whether the received light signal amplified by the high-gain amplifier crosses a second threshold.

\* \* \* \* \*